(12) United States Patent
Lin

(10) Patent No.: US 7,995,285 B2
(45) Date of Patent: Aug. 9, 2011

(54) IMAGING APPARATUS

(75) Inventor: Tsung-Yu Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/776,422

(22) Filed: May 9, 2010

(65) Prior Publication Data

US 2011/0157714 A1    Jun. 30, 2011

(51) Int. Cl.
*G02B 15/14* (2006.01)
(52) U.S. Cl. ........ 359/686; 359/683; 359/715; 359/771; 359/775
(58) Field of Classification Search .................. 359/683, 359/686, 714, 715, 771, 775
See application file for complete search history.

(56) References Cited

U.S. PATENT DOCUMENTS

| 3,926,504 | A  | * | 12/1975 | Fleischman | ................ | 359/714 |
| 4,830,478 | A  | * | 5/1989 | Yamakawa et al. | ........... | 359/714 |
| 7,443,610 | B1 | * | 10/2008 | Lin et al. | ....................... | 359/714 |
| 2010/0073779 | A1 | * | 3/2010 | Wang et al. | ................. | 359/715 |
| 2010/0302653 | A1 | * | 12/2010 | Liang et al. | .................. | 359/715 |

* cited by examiner

*Primary Examiner* — Evelyn A. Lester
(74) *Attorney, Agent, or Firm* — Raymond J. Chew

(57) ABSTRACT

An imaging apparatus includes a first lens has a positive refractive power, a second lens has a positive refractive power, a third lens has a negative refractive power, a fourth lens has a negative refractive power, an image sensor and a driving device. The first lens, the second lens, the third lens, the fourth lens and the image sensor are arranged in the order written along an optical axis of the imaging apparatus from the object side to the image side thereof. The driving device is connected to the second lens and configured for driving the second lens to move toward the object side to perform a zoom-in function of the imaging apparatus.

7 Claims, 12 Drawing Sheets

IMAGING APPARATUS

BACKGROUND

1. Technical Field

The present disclosure relates to an imaging apparatus.

2. Description of Related Art

An imaging apparatus generally includes a number of lenses and an imaging sensor. The imaging apparatus focuses by changing the distance between the lenses. Referring to FIG. 7, a typical imaging apparatus 100 is shown, and includes a first lens 11, a second lens 12, a third lens 13, a fourth lens 14, an image sensor 16, and a driving device 17 aligned from an object side to an image side of the imaging apparatus 100. The first lens 11 and the third lens 13 each have a positive refractive power; the second lens 12 and the fourth lens 14 each have a negative refractive power. The driving device 17 is configured for providing a driving force to the first lens 11 to change the focus setting of the imaging apparatus 100, for example, from a general infinite focus setting to a close-up focus setting. When changing infinite to close-up focus setting, the first lens 11 needs to be moved toward the object side of the imaging apparatus 100.

However, with the above configuration, because the first lens 11 is the outermost lens, when it is moved back and forth in the barrel, it first exposes portions of the barrel, which can collect dust, then encloses those portions so that the dust may penetrate the imaging apparatus. To avoid this, the second lens 12 could be moved instead of the first lens 11, however, movement directions of the lens 12 would be different than the lens 11 and require redesign of the driving device 17 which is difficult and costly.

What is needed therefore, is an imaging apparatus which can overcome the above-mentioned problems.

BRIEF DESCRIPTION OF THE DRAWINGS

The components of the drawings are not necessarily drawn to scale, the emphasis instead being placed upon clearly illustrating the principles of the embodiments of the imaging apparatus. Moreover, in the drawings, like reference numerals designate corresponding parts throughout the views.

DETAILED DESCRIPTION

Figure 1:
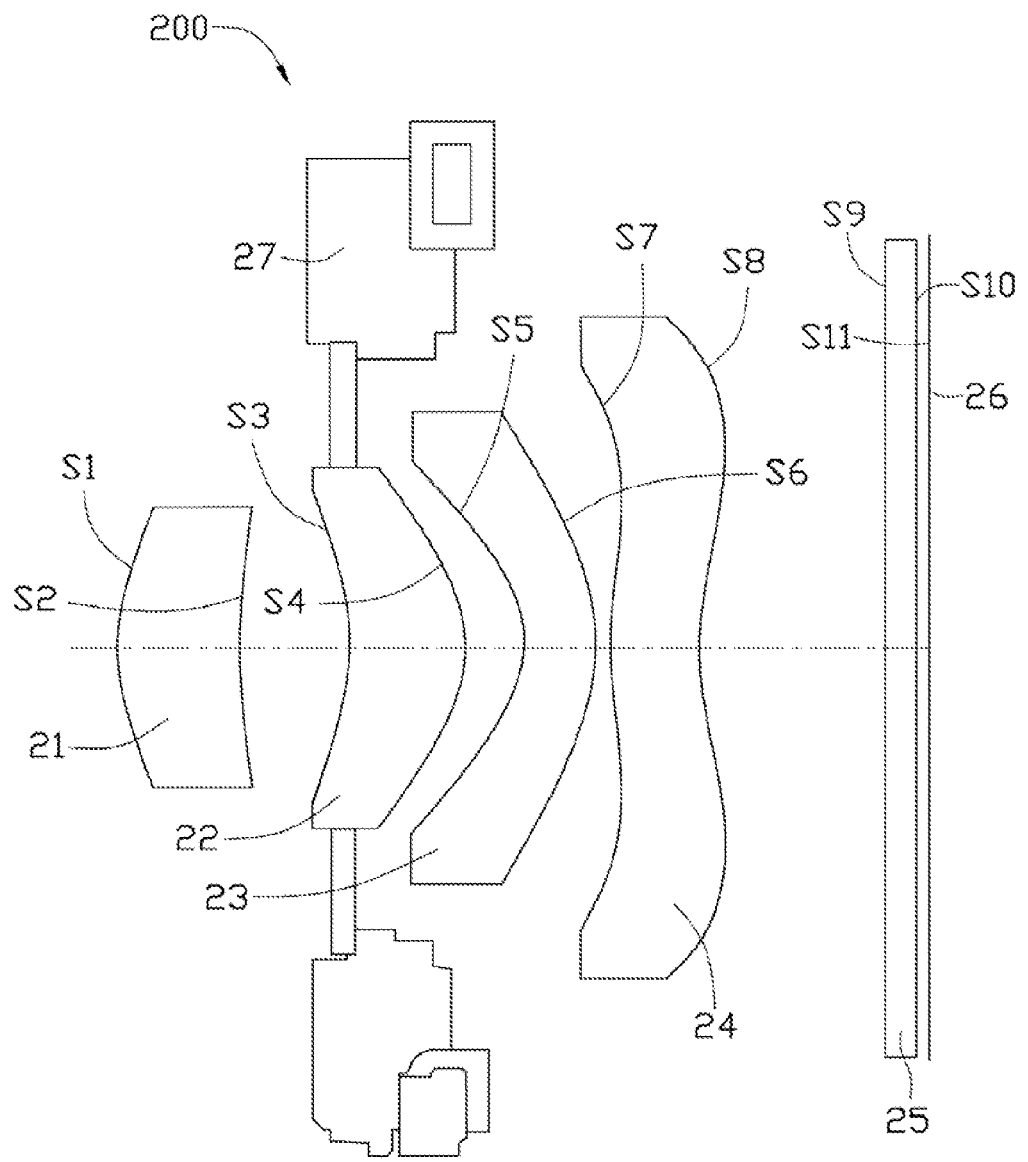
FIG. 1 is a schematic view of an imaging apparatus in accordance with an exemplary embodiment.

Referring to FIG. 1, an imaging apparatus 200, according to an exemplary embodiment, is shown. The imaging lens system 200 includes, in the order from the object side to the image side thereof, a first lens 21, a second lens 22, a third lens 23, a fourth lens 24, an infrared (IR) filter 25, and an image sensor 26 along an optical axis of the imaging apparatus. The first lens 21 and the second lens 22 each have a positive refractive power. The third lens 23 and the fourth lens 24 each have a negative refractive power. The first lens 21 includes a first surface 51 facing the object side and a second surface S2 facing the image side. The second lens 22 includes a third surface S3 facing the object side and a fourth surface S4 facing the image side. The third lens 23 includes a fifth surface S5 facing the object side and a sixth surface S6 facing the image side. The fourth lens 21 includes a seventh surface S7 facing the object side and an eighth surface S8 facing the image side. The IR filter 25 includes a ninth surface S9 facing the object side and a tenth surface S10 facing the image side. The image sensor 26 includes an imaging surface S11 facing the object side. The imaging apparatus 100 includes a driving device 27 connected to the second lens 22 for driving the second lens 22 to move relative to the other lenses 21, 23, 24. In this embodiment, the driving device 27 employs Micro-Electro-Mechanical System (MEMS). When an electrical signal is applied, the driving device 27 drives the second lens 21 to move toward the object side for changing the focus setting to a close-up setting, which in this embodiment is 130 mm, and when the signal is discontinued, the MEMS system is configured so that the second lens 21 returns to the original position, and the imaging apparatus 100 is once again at a focus setting of infinity.

The four lenses 21, 22, 23, 24 can be made of plastic, to reduce costs, and all have opposite aspherical surfaces (i.e., the aspherical object-side surface and the aspherical image-side surface) to efficiently correct aberration. The aspherical surface is shaped according to the formula:

$$x = \frac{ch^2}{1 + \sqrt{1 - (k+1)c^2h^2}} + \sum A_i h^i,$$

where h represents a height from the optical axis of the imaging apparatus 100 to the aspherical surface, c represents a vertex curvature of the aspherical surface, k represents a conic constant, and $A_i$ represents i-th order correction coefficients of the aspherical surfaces. In this embodiment, i is consecutively selected as 2, 4, 6, 8, 10, 12, 14, 16.

Table 1 shows the parameters of the surfaces S1-S11 of the imaging apparatus 100. Wherein the parameters: R is the curvature radius of the surface, T is the thickness from the vertex of the surface to the center of the lens, D is the diameter of the surface, c is the vertex curvature of the surface.

TABLE 1

| surface | R (mm) | T (mm) | D (mm) | c |
|---|---|---|---|---|
| S1 | 1.731347 | 0.7846212 | 1.708706 | −0.1575986 |
| S2 | 5.654134 | 0.7083767 | 1.814889 | 8.357825 |

TABLE 1-continued

| surface | R (mm) | T (mm) | D (mm) | c |
|---|---|---|---|---|
| S3 | −3.165175 | 0.7353476 | 2.000654 | 6.205366 |
| S4 | −1.363651 | 0.3793287 | 2.334389 | −0.07088122 |
| S5 | −1.072565 | 0.4519977 | 2.405071 | −0.3554816 |
| S6 | −1.865506 | 0.09938743 | 3.061868 | −0.5031622 |
| S7 | 2.628168 | 0.5680002 | 3.65358 | −22.5571 |
| S8 | 1.780748 | 1.196108 | 4.281321 | −10.82631 |

TABLE 1-continued

| surface | R (mm) | T (mm) | D (mm) | c |
|---|---|---|---|---|
| S9 | infinite | 0.2 | 5.205832 | 0 |
| S10 | infinite | 0.08 | 5.289794 | 0 |
| S11 | infinite | — | 5.342397 | 0 |

Table 2 shows the correction coefficients of the aspherical surfaces S1-S11.

TABLE 2

| surface | Aspherical coefficients |
|---|---|
| S1 | $A_2 = 0$, $A_4 = 0.021217565$, $A_6 = −0.028440835$, $A_8 = 0.024191503$, $A_{10} = −0.0029946484$, $A_{12} = 0$, $A_{14} = 0$, $A_{16} = 0$ |
| S2 | $A_2 = 0$, $A_4 = −0.0099872449$, $A_6 = 0.065222976$, $A_8 = −0.10203573$, $A_{10} = 0.048472065$, $A_{12} = 0$, $A_{14} = 0$, $A_{16} = 0$ |
| S3 | $A_2 = 0$, $A_4 = −0.0018141629$, $A_6 = −0.095881041$, $A_8 = 0.095679981$, $A_{10} = −0.031420991$, $A_{12} = 0$, $A_{14} = 0$, $A_{16} = 0$ |
| S4 | $A_2 = 0$, $A_4 = −0.0094902021$, $A_6 = 0.02156301$, $A_8 = 0.0013965123$, $A_{10} = 0.0090680986$, $A_{12} = 0$, $A_{14} = 0$, $A_{16} = 0$ |
| S5 | $A_2 = 0$, $A_4 = 0.018061297$, $A_6 = 0.050131285$, $A_8 = 0.00034250907$, $A_{10} = 0.0038501864$, $A_{12} = 0$, $A_{14} = 0$, $A_{16} = 0$ |
| S6 | $A_2 = 0$, $A_4 = 0.0031926809$, $A_6 = −0.0023954768$, $A_8 = 0.00030728017$, $A_{10} = 0.00055301174$, $A_{12} = 0$, $A_{14} = 0$, $A_{16} = 0$ |
| S7 | $A_2 = 0$, $A_4 = −0.05686144$, $A_6 = 0.0016092546$, $A_8 = 0.00065780149$, $A_{10} = 0.00003209607$, $A_{12} = 0$, $A_{14} = 0$, $A_{16} = 0$ |
| S8 | $A_2 = 0$, $A_4 = −0.05686144$, $A_6 = 0.0016092546$, $A_8 = 0.00065780149$, $A_{10} = 0.00003209607$, $A_{12} = 0$, $A_{14} = 0$, $A_{16} = 0$ |
| S9 | $A_2 = 0$, $A_4 = −0.039278385$, $A_6 = 0.0019164893$, $A_8 = 0.000087467085$, $A_{10} = −0.00006602053$, $A_{12} = 0$, $A_{14} = 0$, $A_{16} = 0$ |

Figure 7:
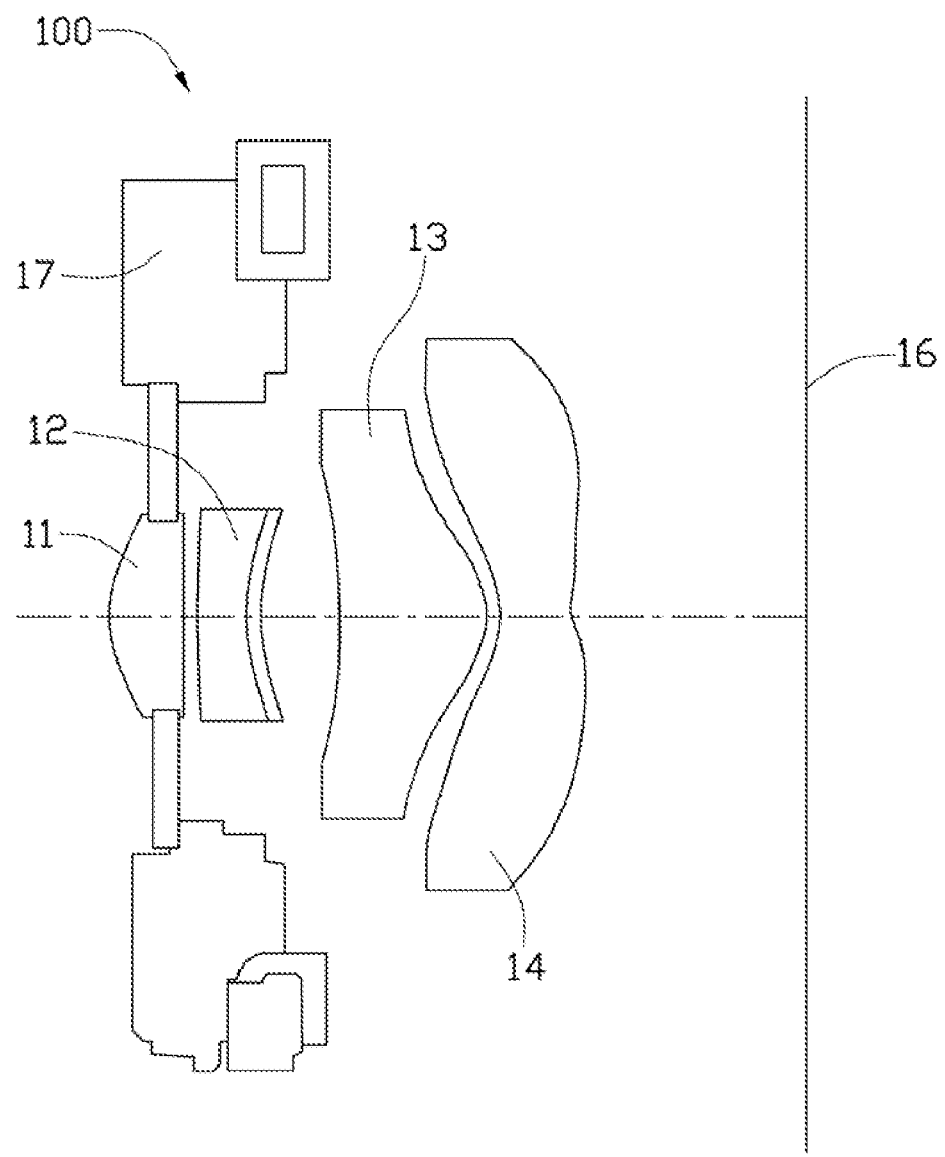
FIG. 7 is schematic view of a typical imaging apparatus.

The imaging apparatus 100 changes the focusing position by moving the second lens 22. In general, the imaging apparatus 100 is at a general infinite focus setting, the second lens 22 is moved to the object side when changing the focus setting of the imaging apparatus 100 from the general infinite focus setting to the close-up focus setting. The movement direction of second lens 21 from the general infinite focus setting to the close-up focus setting is the same as the direction the first lens 11 of FIG. 7 would be moved for the same adjustment, therefore, there is no need to reverse or change the driving device 27.

In this embodiment, light with the wavelength of 656.3 nanometers (nm), 587.6 nm, 546.1 nm and 436.0 nm are selected for testing the optical characteristics of the imaging apparatus. The refractive indexes of the lenses 21, 22, 23, 24 and the IR filter 25 are greater than 1.5. Table 3 shows the detailed refractive indexes of lenses 21, 22, 23, 24 and the IR filter 25 in response to different wavelengths of light.

TABLE 3

| | refractive index | | | | |
|---|---|---|---|---|---|
| optical element | 656.3 nm | 587.6 nm | 546.1 nm | 486.1 nm | 436.0 nm |
| first lens | 1.54120000 | 1.54410000 | 1.54650000 | 1.55090000 | 1.55637103 |
| second lens | 1.54120000 | 1.54410000 | 1.54650000 | 1.55090000 | 1.55637103 |
| third lens | 1.62493710 | 1.63235424 | 1.63880640 | 1.65202356 | 1.66899669 |
| fourth lens | 1.52835081 | 1.53115832 | 1.53341477 | 1.53783223 | 1.54314926 |
| IR filter | 1.52036567 | 1.52307826 | 1.52520731 | 1.52929991 | 1.53414920 |

The imaging apparatus can focus at a close-up focus setting as 100 mm. In this embodiment, focusing at 130 mm is selected as the close-up focus setting.

Figure 2A:
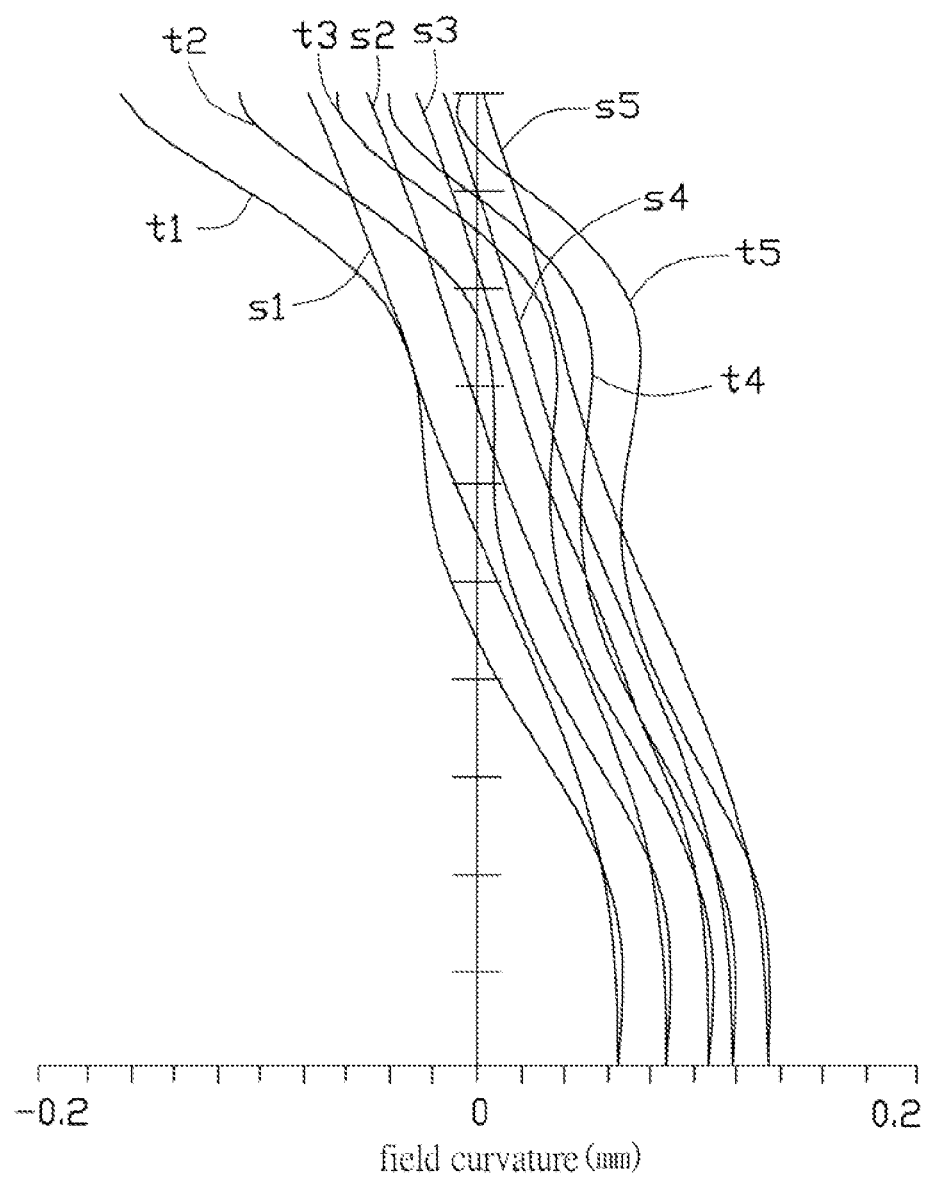
FIG. 2A is a graph field curvature diagram of the imaging apparatus of FIG. 1, with a focus setting of infinity.
Figure 2B:
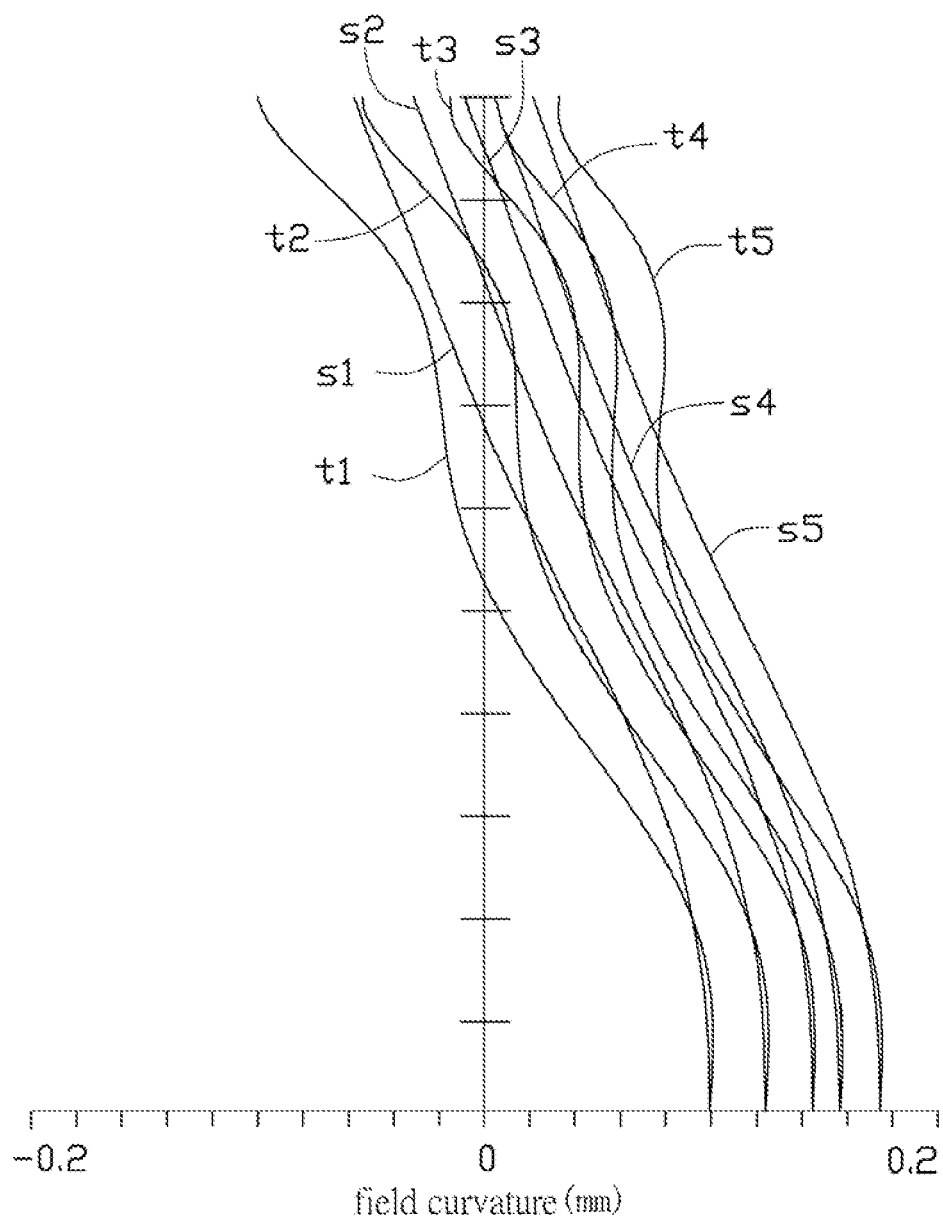
FIG. 2B is a graph field curvature diagram of the imaging apparatus of FIG. 1, with a focus setting of 130 millimeters.

As illustrated in FIGS. 2A-2B, the curves t and s are the tangential field curvature curve and the sagittal field curvature curve respectively. Wherein, t1-t5 are tangential field curvature curves of light with wavelengths of 436.0 nm, 486.1 nm, 546.1 nm, 587.6 nm and 656.3 nm respectively; s1-s5 are sagittal field curvature curves of light with wavelengths of 436.0 nm, 486.1 nm, 546.1 nm, 587.6 nm and 656.3 nm respectively. Clearly, field curvature occurring in the imaging apparatus 100 is limited to a range of: −0.2 mm~0.2 mm.

Figure 3A:
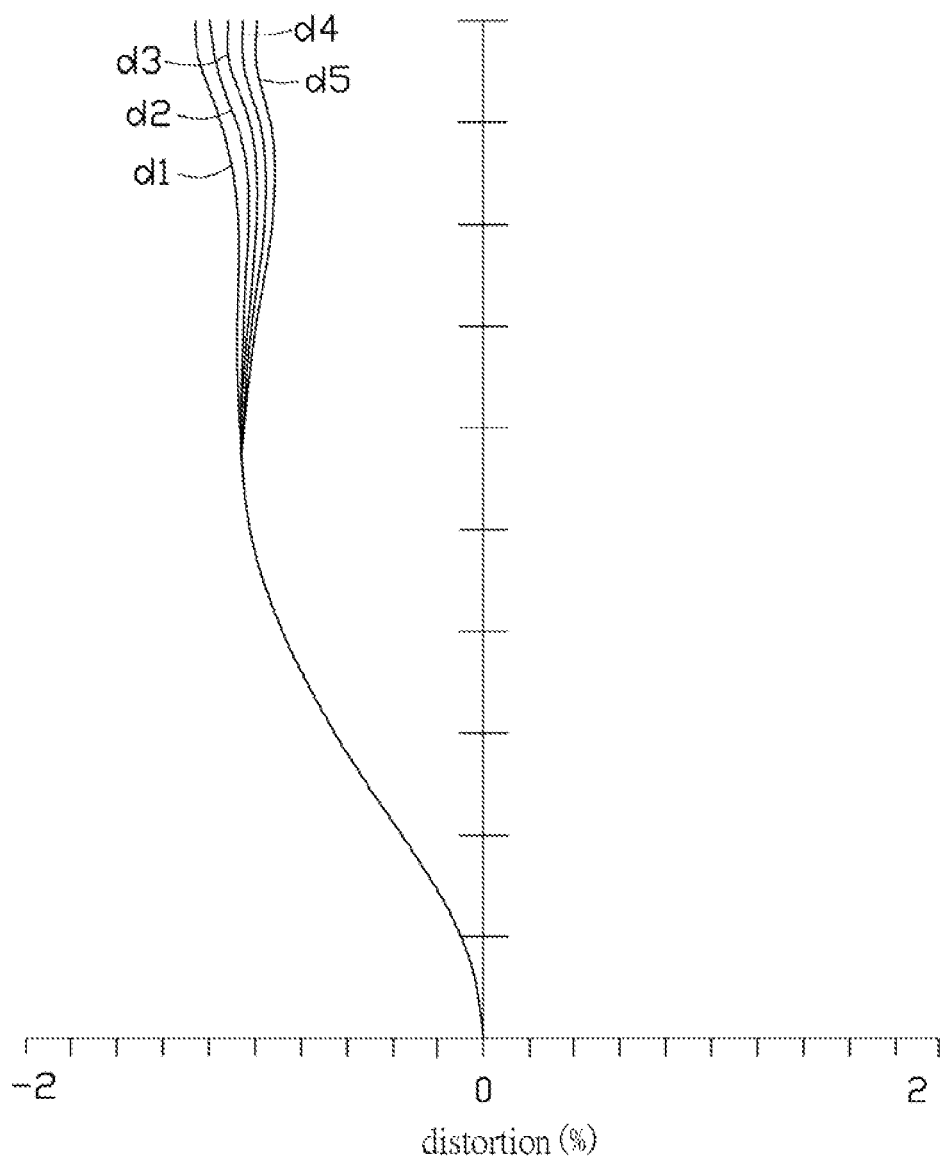
FIG. 3A is a distortion diagram of the imaging apparatus of FIG. 1, with focus setting of infinity
Figure 3B:
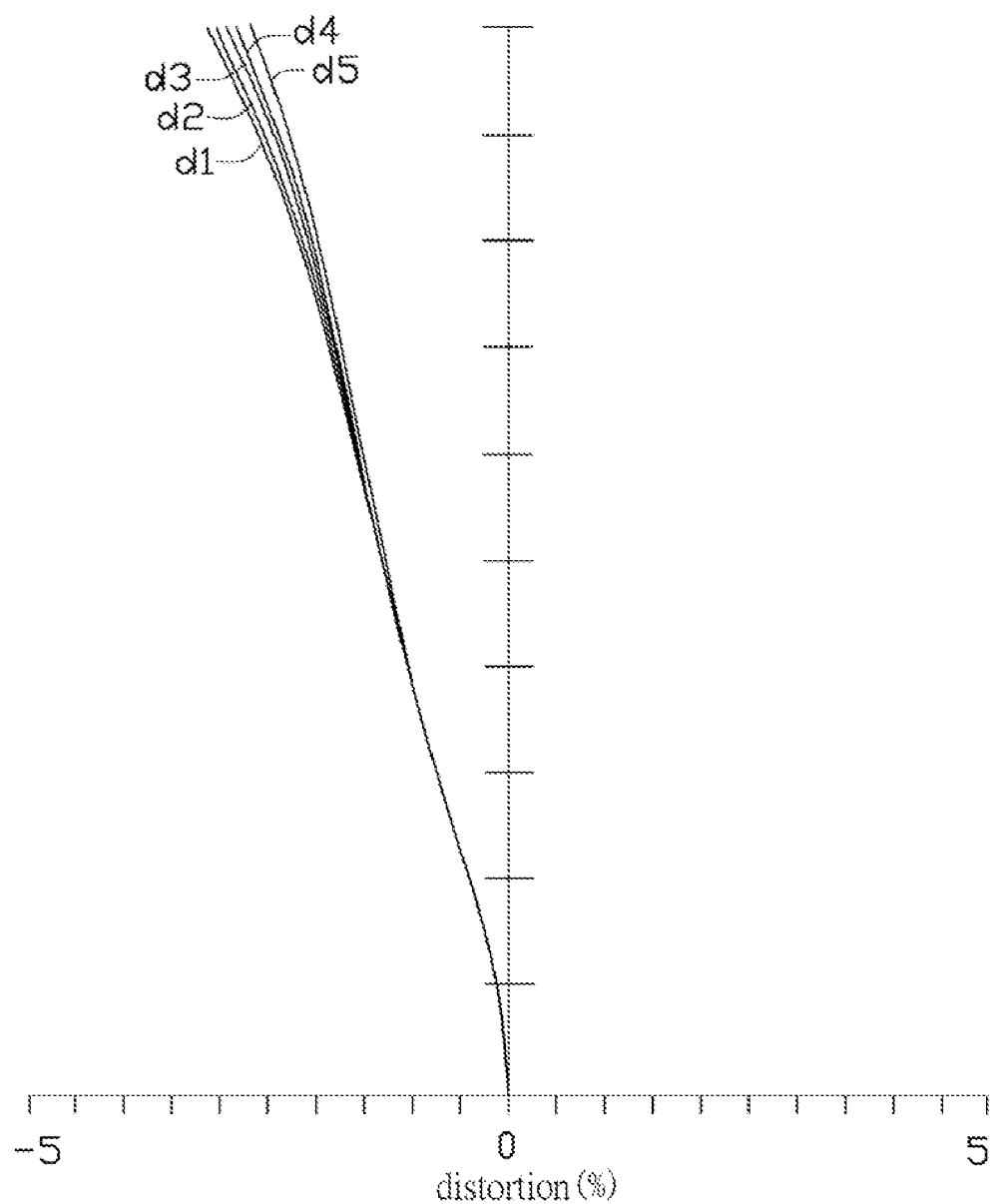
FIG. 3B is a distortion diagram of the imaging apparatus of FIG. 1, with focus setting of 130 millimeters.

In FIGS. 3A-3B, d1-d5 are distortion curves of light with wavelengths of 436.0 nm, 486.1 nm, 546.1 nm, 587.6 nm and 656.3 nm respectively. The distortion occurring in the imaging apparatus 100 is limited within the range of: −5%~0.

Figure 4A:
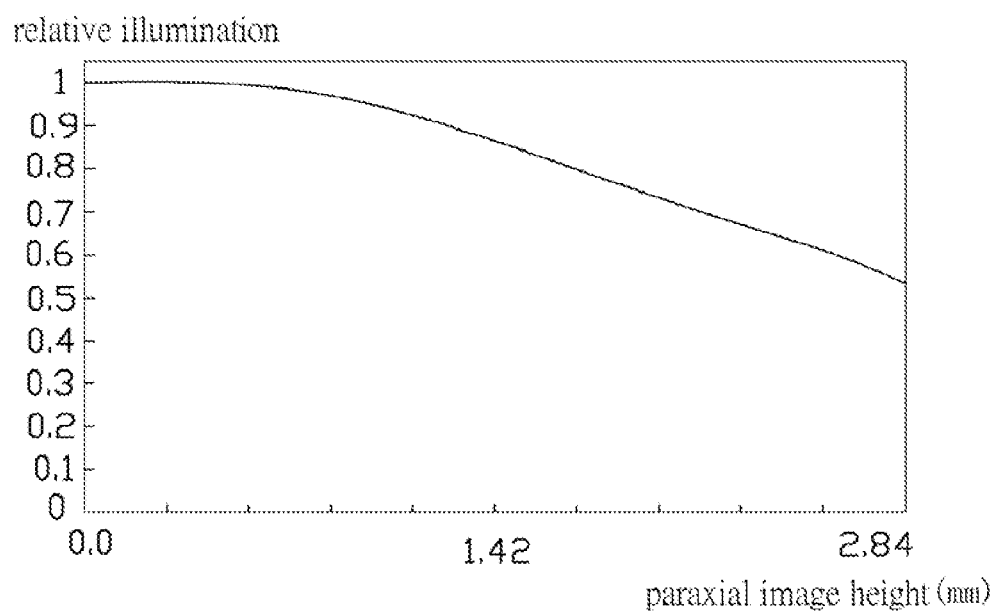
FIG. 4A is a relative illumination diagram of the imaging apparatus of FIG. 1, with focus setting of infinity.
Figure 4B:
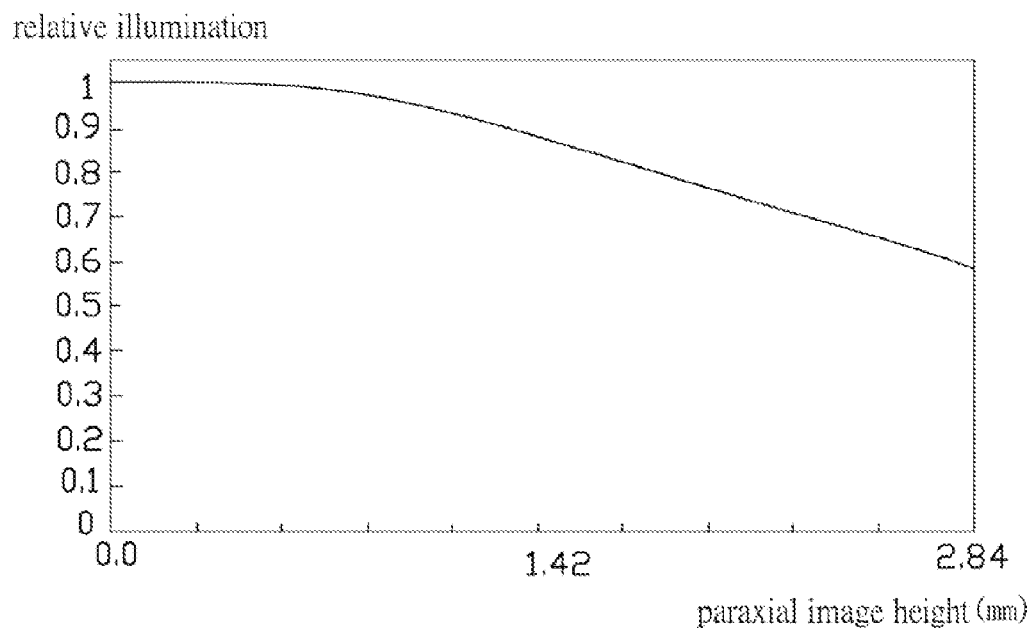
FIG. 4B is a relative illumination diagram of the imaging apparatus of FIG. 1, with focus setting of 130 millimeters.

FIGS. 4A-4B are diagrams of the relative illumination curve of light with wavelength of 546.1 nm. The relative illumination in the imaging apparatus 100 is kept over 50%.

Figure 5A:
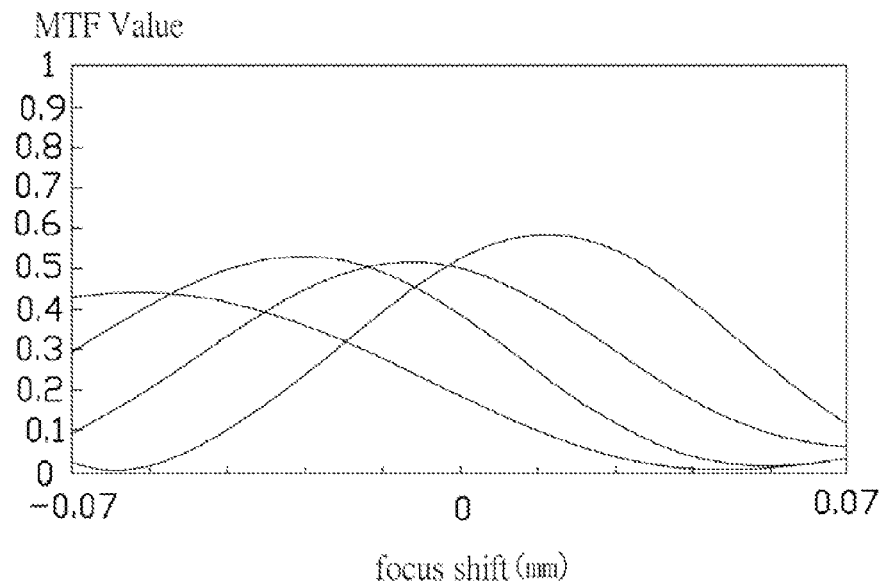
FIG. 5A is a relationship diagram between the MTF value and the focus shift value of the imaging apparatus of FIG. 1, with focus setting of infinity.
Figure 5B:
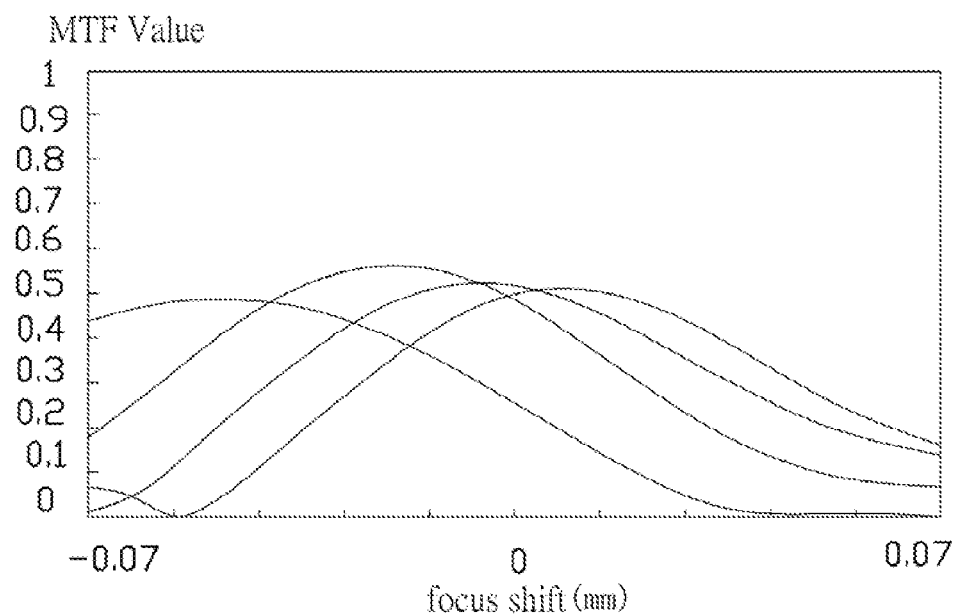
FIG. 5B is a relationship diagram between the MTF value and the focus shift value of the imaging apparatus of FIG. 1, with focus setting of 130 millimeters.

FIGS. 5A-5B are diagrams of the relationships between the MTF (Modulation Transfer Function) value and the focus shift value. Different curves represent the relationships between the MTF value and the focus shift value under different apertures of the imaging apparatus 100. The focus shift value of the imaging apparatus 100 is limited with in −0.07 mm~0.07 mm.

Figure 6A:
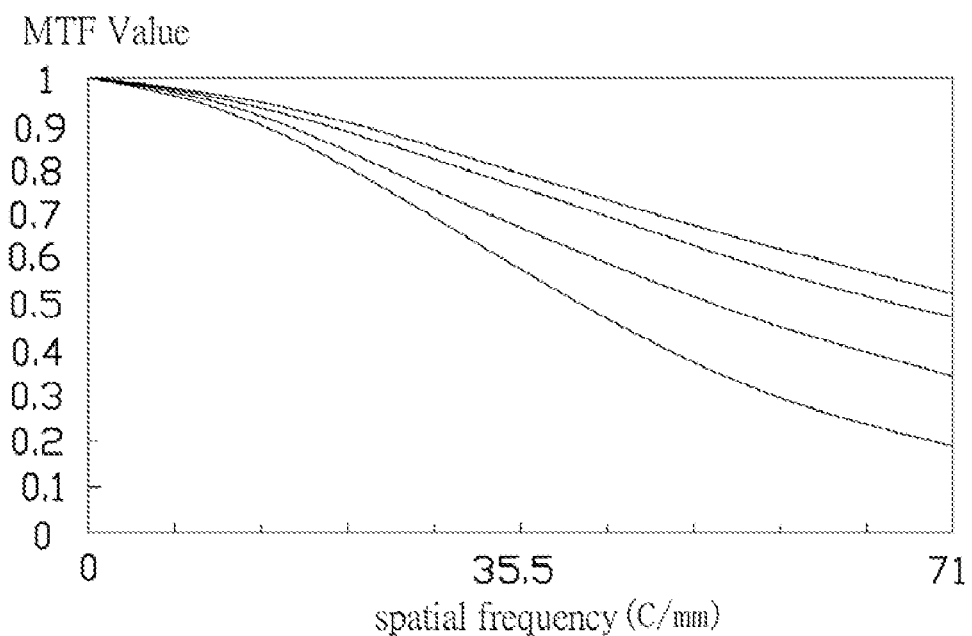
FIG. 6A is a relationship diagram between the MTF value and the spatial frequency value of the imaging apparatus of FIG. 1, with focus setting of infinity.
Figure 6B:
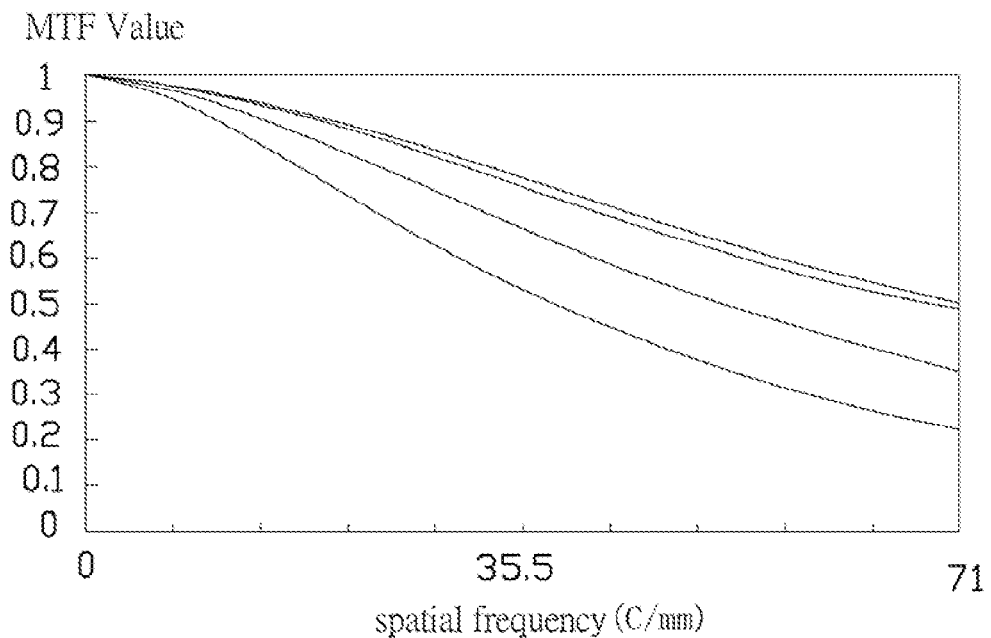
FIG. 6B is a relationship diagram between the MTF value and the spatial frequency value of the imaging apparatus of FIG. 1, with focus setting of 130 millimeters.

FIGS. 6A-6B are diagrams of the relationships between the MTF value and the spatial frequency value. Different curves represent the relationships between the MTF value and the spatial frequency value under different apertures of the imaging apparatus 100. In this embodiment, the spatial frequency is the number of the cycles of light and shade stripes per millimeter. The MTF value has a small change with the changing of the spatial frequency value, thus the imaging module 100 can keep satisfactory resolution and contrast.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:
1. An imaging apparatus, comprising
a first lens having a positive refractive power, a second lens having a positive refractive power,
a third lens having a negative refractive power,
a fourth lens having a negative refractive power,
an image sensor, and
a driving device connected to the second lens, the first lens, the second lens, the third lens, the fourth lens and the image sensor being arranged in the order written along an optical axis of the imaging apparatus from the object side to the image side thereof, the driving device configured for driving the second lens to move toward the object side to perform a zoom-in function of the imaging apparatus.

2. The imaging apparatus of claim 1, wherein the first lens, the second lens, the third lens, and the fourth lens are made of plastic.

3. The imaging apparatus of claim 1, wherein each of the first lens, the second lens, the third lens and the fourth lens comprises opposite aspherical surfaces.

4. The imaging apparatus of claim 3, wherein the aspherical surfaces of the first lens, the second lens, the third lens and the fourth lens is shaped according to the formula:

$$x = \frac{ch^2}{1 + \sqrt{1-(k+1)c^2h^2}} + \sum A_i h^i,$$

where h represents a height from the optical axis of the imaging apparatus to the aspherical surface, c represents a vertex curvature of the aspherical surface, k represents a conic constant, and $A_i$ represents i-th order correction coefficients of the aspherical surfaces.

5. The imaging apparatus of claim 4, wherein i is consecutively selected as 2, 4, 6, 8, 10, 12, 14, 16.

6. The imaging apparatus of claim 1, wherein the refractive indexes of the first lens, the second lens, the third lens and the fourth lens are greater than 1.5.

7. The imaging apparatus of claim 1, further comprising an infrared filter positioned between the fourth lens and the image sensor.

* * * * *